(No Model.)
J. GREEN.
CAR COUPLING.
No. 458,528. Patented Aug. 25, 1891.
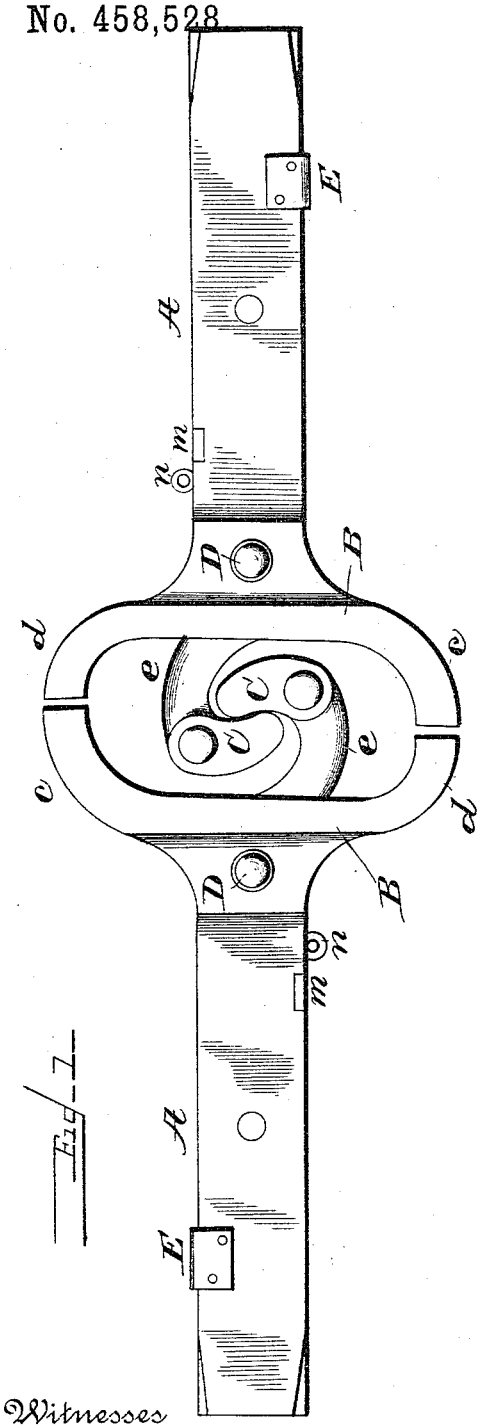
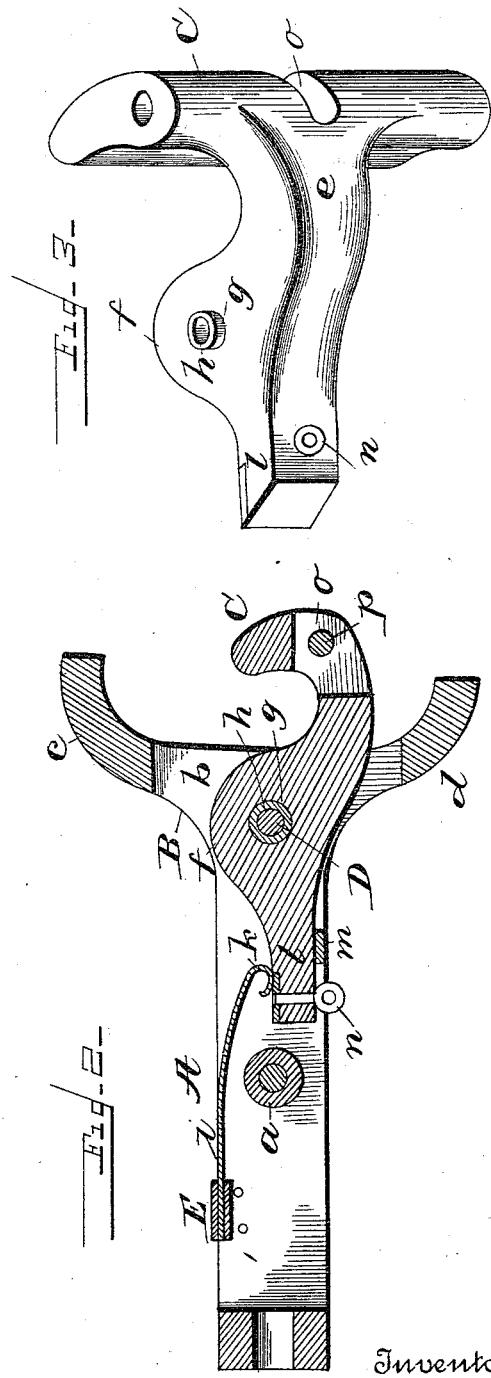
Witnesses
D. A. Taubuschmidt
H. B. Rimohl
Inventor
John Green
By Johnston & Rimohl
Attorneys

UNITED STATES PATENT OFFICE.

JOHN GREEN, OF RENOVO, PENNSYLVANIA, ASSIGNOR OF TWO-THIRDS TO D. R. PFOUTZ, OF SAME PLACE.

CAR-COUPLING.

SPECIFICATION forming part of Letters Patent No. 458,528, dated August 25, 1891.

Application filed May 18, 1891. Serial No. 393,216. (No model.)

*To all whom it may concern:*

Be it known that I, JOHN GREEN, a citizen of the United States, residing at Renovo, in the county of Clinton and State of Pennsylvania, have invented certain new and useful Improvements in Car-Couplings; and I do hereby declare the following to be a full, clear, and exact description of the invention, such as will enable others skilled in the art to which it appertains to make and use the same.

My invention relates to car-couplings, and has especial reference to that class of couplings known as "automatic," and is adapted to couple with any of the standard master car-builders' couplings.

The object of the invention is to produce a cheap coupling which is provided with an effective bumping or concussion surface that will avoid wear upon the outer surface of the coupling-hook and chaffing upon the face of the draw-head adjacent to the coupled hook.

The invention will be hereinafter described, and particularly pointed out in the claims.

In the accompanying drawings, which form part of this specification, Figure 1 represents a top plan view of my improved coupling in locked position; Fig. 2, a horizontal section of one of the couplings, and Fig. 3 a perspective of the hook detached.

Reference being had to the drawings and the letters thereon, A indicates the body portion of the draw-bar, between the sides of which is placed a spool or column $a$; B, the head in which is formed a transverse slot $b$, in which the coupling-hook C vibrates laterally and is provided with horns or extensions $c\,d$, the former being longer than the latter and having a curved inner surface which forms a guide to direct the hook on the coupling of an adjacent car toward the vertical center of the head and into engagement with its hook. The wall of the slot $b$ in the horn $d$ forms a stop to prevent the hook being pushed back too far when uncoupled from another coupling. The ends of the horns $c\,d$ form bumping-surfaces when two couplings are brought together, and are of such length that the outer face of the coupling-hook C cannot wear or chafe against the adjacent surface of the draw-head, thus relieving the hook and head from wear at the points named.

The rear surface $e$ of the hook is rounder and the wall of the slot $b$ is made to conform therewith to prevent the hook binding or becoming fast in the slot either in coupling or uncoupling. The hook C is provided with a swell $f$, through which is formed an aperture $g$ for the pin D, and in the aperture $g$ is placed a steel bushing $h$ to cause the wear to be expended upon the pin D and the bushing. The bushing projects a little beyond the upper and lower surfaces of the hook, which relieves the hook from frictional contact with the draw-bar and permits of a little vertical deflection of the hook in coupling with cars in which the couplings are a little higher or lower.

E indicates a bar secured in any preferred manner to the upper and lower side bars of the body of the draw-bar, and to this bar E is secured a leaf-spring $i$, the outer end $k$ of which bears upon the extension $l$ of the hook C and holds the hook in position for coupling. It is obvious that this spring may be secured to the rear surface of the horn $c$ of the draw-head, be extended rearward, and accomplish the same result. The movement of the hook by the spring $i$ is limited by the bar $m$, against which the rear surface of the hook rests. To the rear surface of the hook is attached an eye $n$ to receive the end of a rod (not shown) used for disengaging the couplings. The head of the hook C is provided with a slot $o$ and a pin $p$ to receive an ordinary link. It will be observed that the effect of the spring $i$ bearing upon the extension of the hook C in this construction is to keep the hooks normally closed instead of open, as has heretofore been the usual practice, and that the hook cannot become accidentally disengaged in rounding curves or otherwise while the cars are in upright position; but should a car be turned over upon its side the couplings will disengage automatically.

Having thus fully described my invention, what I claim is—

1. A car-coupling having horns on both sides of the draw-head and a lateral slot in the head extending into one horn to limit the movement of the hook, in combination with a hook pivoted in the center of the draw-bar in the rear of the head and extending beyond the horns of the head to prevent chafing between the head of the hook and the outer surface of the head of the draw-bar.

2. A car-coupling having horns on both sides of the draw-head and a lateral slot in the head extending into one of the horns and forming a concave seat, in combination with a hook having a swell through which a pin passes in the rear of the draw-head, and a rounded rear portion which engages the concave seat in the horn, said hook extending beyond the horns on the draw-head, as and for the purpose described.

3. A car-coupling having horns on both sides of the draw-head and a lateral slot in said head, in combination with a hook pivotally secured in said slot, provided with a head having a slot and a pin passing through said slot, a rearward extension and a spring bearing upon said extension near the outer end thereof, and a stop to limit the throw of the hook.

4. A car-coupling having a laterally-swinging hook, in combination with a bar on one side of the draw-bar, a spring secured to said bar and engaging the hook at its free end, and a stop-bar on the opposite side of the draw-bar.

In testimony whereof I affix my signature in presence of two witnesses.

JOHN GREEN.

Witnesses:
D. C. REINOHL,
L. P. WHITAKER.